United States Patent Office 2,915,324
Patented Dec. 1, 1959

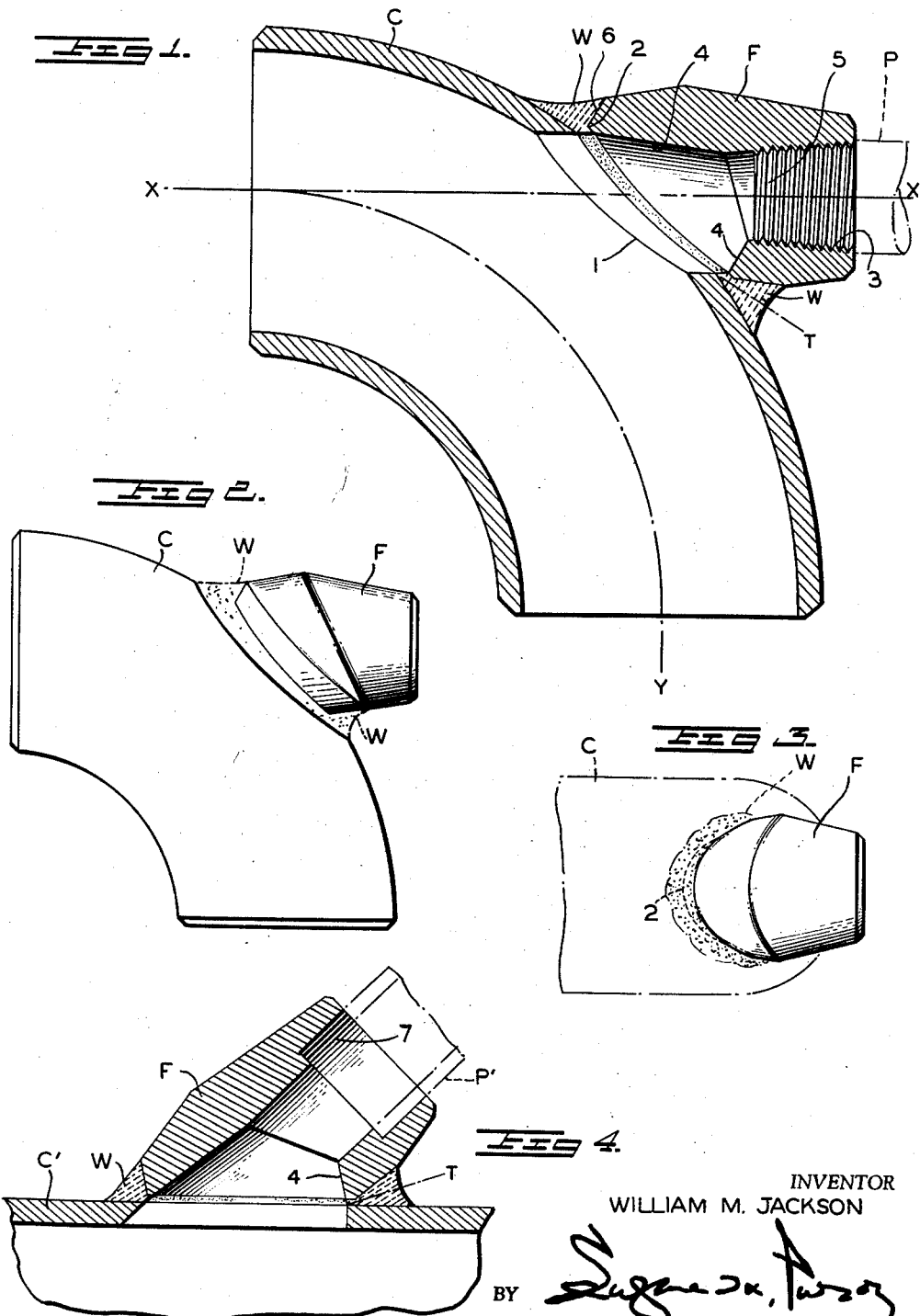

2,915,324

WELDED OUTLET FITTING

William M. Jackson, Scarsdale, N.Y., assignor to Bonney Forge & Tool Works, Allentown, Pa., a corporation of Pennsylvania Application November 30, 1956, Serial No. 625,463

2 Claims. (Cl. 285—150)

This invention relates to welded outlet fittings for metal conduits, pipes, tubes, tanks or other cylindrical bodies, and especially those for confining fluids under relatively high pressures.

An important object of the invention is to provide a welded outlet fitting of the above character which is so constructed and arranged as to provide an angled connection between a conduit and a branch pipe, this fitting having one end shaped as a saddle portion adapted to seat upon the circumference of the conduit in a slanted position and being internally flared so as to open through the saddle end of the fitting in approximately intersecting relationship with the outer circumference of the fitting in that area of the fitting which forms an acute angle with the surrounding surface of the conduit. This construction allows bonding of the fitting to the conduit by a "full penetration weld," by which term is meant the penetration of the weld metal between the saddle and the conduit completely to the inner circumference of the fitting and the complete fusion of metal throughout this area.

A further important object of the invention is to provide a welded outlet fitting of the above character having a saddle portion which is so constructed and arranged as to seat upon the circumference of the conduit and provide an angled connection between the conduit and a branch pipe at a locality along a bend of the conduit in such a manner that the fluid may pass from the conduit into the branch pipe with the least disturbance to its flow.

Another object of the invention is to provide a welded outlet fitting of the above character having a saddle portion so shaped as to seat upon the circumference of the conduit at its bend and to provide for a full penetration of weld metal between the fitting and the conduit in order to insure a strong, fluid-tight and reliable joint between the fitting and the conduit.

Another object of the invention is to provide a welded outlet fitting of the above character having a saddle portion so shaped as to seat upon the circumference of the conduit at its bend and having a weld bevel so dimensioned as to provide for the deposition of a band of weld metal of progressively increasing throat thickness from the longer side of the fitting, making an obtuse angle with the surrounding surface of the conduit, toward the shorter side of the fitting, making an acute angle with the surrounding surface of the conduit. By the term "throat thickness" as used herein is meant the shortest distance measured from a point upon the inner circumferential edge of the fitting to the outer surface of the weld. By virtue of this construction, the greater stresses which inherently occur in the more acutely angled areas between the fitting and the conduit are compensated for.

Still another object of the invention is to provide a welded outlet fitting capable of effectively resisting stresses developed either internally by the pressure of the fluid flowing therethrough, or externally by shocks or vibrations imparted to the fitting during or after its installation in place.

Various other objects and advantages will be apparent from the following detailed description of a preferred embodiment of the invention, reference being made to the accompanying drawing in which:

Figure 1 is a view of a welded outlet fitting in longitudinal cross-section, showing the manner in which it is intended to be applied to the bend of a conduit;

Figure 2 is a side elevation of the fitting of Fig. 1;

Figure 3 is a plan view of the fitting; and

Figure 4 is a longitudinal cross-sectional view of a fitting of slightly modified form showing the manner in which it may be welded to a straight conduit.

It is often necessary in the case of many piping systems, such for example as steam, gas or process piping in refineries and chemical manufacturing plants operating under either low or high pressures, to provide branch connections at the elbows or bends of the conduits composing a system, such branch connections leading, for example, to flow, temperature or pressure measuring devices. The making of such branch connections with the limited number of metal working tools available in the field is especially difficult because of the double curvature of the circumferential surface of the bend with which the connection is to be made and the necessity for so uniting a branch connection with the conduit at an angle such that the extended center line of the connection lies tangent to the center line of the bend. The making of such connections is further complicated by the the stresses developed in the fitting at such points of off-take, which requires that a branch connection be constructed so as to provide for the deposition of weld metal surrounding the joint in an amount and manner to effectively withstand such stresses.

In the drawing is illustrated a welded outlet fitting F providing a connection between a metal conduit C and a metal branch or offtake pipe P. The conduit is bent in an arc having a relatively long radius and is provided through its wall with a circular opening 1 located upon its surface of greatest arc. The outlet fitting F comprises a tubular steel forging having one end terminating in a saddle 2 contoured to seat upon the circumference of the conduit surrounding the opening. The saddle conforms to the double curvature of the circumference of the conduit. That is to say, the edge of the fitting defining the saddle is shaped to conform to the arc of curvature of the conduit as determined by the radius of the conduit and is also shaped to conform to the arc of curvature of the conduit as determined by the longer radius of its bend, these radii lying in planes at right-angles to each other.

The fitting is thus adapted to straddle the conduit with the perimetral edge defining the saddle closely coinciding with the outer double-curved surface of the conduit. The saddle 2 is also so located with respect to the longitudinal axis X—X of the fitting that the prolongation of this axis, when the fitting is welded in place, forms a tangent to the axis X—Y of the conduit C. This avoids an abrupt change of direction of the fluid flowing from the conduit into the fitting (or from the fitting into the conduit) and provides means for locating measuring devices responsive to temperature or flow at the center of the conduit. The cylindrical bore 5 of the fitting is flared outwardly, as indicated at 4, through the saddle end of the fitting, to allow a full penetration weld at the portion of the fitting which forms an acute angle with the conduit.

As indicated in Fig. 1, the flare 4 extends substantially throughout the thickness of the wall of the fitting upon the shorter side of the fitting (that is, the circumferential side of the fitting making an acute angle with the circumference of the conduit) and intersects the outer circumference of the fitting, whereas the flare upon the opposite and longer side of the fitting (that is the side of the fitting that makes an obtuse angle with the circumference of the conduit) terminates a distance substantially inwardly from the outer circumference of the fitting. The bore of the fitting is internally threaded, as indicated at 3, to permit a branch pipe P to be screwed therein, but the fitting may be adapted for socket welding, butt welding or any other means of attachment. Externally the fitting is tapered outwardly from its opposite ends as shown in the drawings. The external taper combined with the internal flare increases the wall thickness of the fitting in a zone located a short distance above the fillet formed by the weld metal W when the fitting is welded in place.

In order to obtain a full penetration weld between the fitting and the conduit, the edge of the saddle is beveled, as indicated at 6, to form with the surrounding circumferential surface of the conduit C, a V-shaped groove for the reception of weld metal. The width of the weld bevel 6 progressively increases in a direction around the fitting from its long side toward its short side but due to the inclination of the fitting with respect to the conduit, the angle which the bevel 6 makes with the outer circumference of the fitting likewise decreases from the longer side of the fitting toward its shorter side. By virtue of the increasing width of the weld bevel, the band of weld metal deposited in the groove is of progressively increasing throat thickness (indicated at T in Fig. 4) from the longer toward the shorter sides of the fitting, as will be seen from Fig. 1. This insures the deposition of adequate weld metal along the short side of the fitting where its angular relationship with the conduit C is most acute, and hence where the greatest stresses in the fitting inherently occur. Also because of the angular relationship of the weld bevel 6 with respect to the circumference of the conduit, the reentrant angle between the saddle and the conduit is not so sharp as to preclude access of a welding rod thereto. Finally, as a result of the flare 4, the weld metal can penetrate completely between the fitting and the conduit, such penetration being especially important throughout the extent of the weld groove lying upon the shorter side of the fitting, in which vicinity the fitting is subject to maximum stresses. Otherwise stated, the saddle comprises beveled portions upon both its inside and outside surfaces completely encircling the fitting and disposed at progressively varying angles with respect to the axis of the fitting, the outside beveled portion extending downwardly toward the saddle end and acutely inwardly along the longer side of the fitting and gradually changing to zero angle at the short side of the fitting; and the inside bevel extending downwardly and acutely outwardly at the short side of the fitting and gradually decreasing to minimum angularity at the long side of the fitting, so that the bevel portions define with the circumference of the conduit a groove for the reception of weld metal in a manner such as to insure a full-penetration weld.

The fittings F may be manufactured in various sizes to fit conduits of different diameters and different degrees of curvature, or the fitting may be made embodying certain features of the invention for use with a straight conduit. However, it is practicable to use the "bend" type of fitting described above for connecting a branch pipe P′ with a straight conduit C′, as illustrated in Fig. 4. In such cases the curvature of arc for which the fitting is made does not prevent the saddle from fitting reasonably snugly the circumference of the conduit, and any slight deviation in fit may be compensated for by increasing the amount of weld metal W which fills any cracks or spaces between the saddle and the conduit.

In this slightly modified form, the outer end of the fitting is formed with a socket 7 to allow the end of the branch pipe P′ to be slipped into the fitting and subsequently welded in place. So far as the connection between the branch pipe and the fitting is concerned, any of the many conventional means for effecting such a connection may be adopted as appears to be most suitable under the circumstances.

The more acute the angle between branch and conduit, the more difficult it becomes to make a full penetration weld. Angular connections are primarily disposed at 45° and obtaining a full penetration weld at such a sharp angle is impracticable. According to the invention, in the area of the acute angle between the fitting and the conduit, the intersection of the internal flare 4 and the bevel 6 is such that the angle of the weld groove is inherently wider and more accessible by a weld rod, whereby to facilitate welding and to produce a full penetration weld.

While I have illustrated and described the fitting as providing communication between a conduit and a branch pipe, manifestly the fitting may be used without piercing of the wall of the conduit for attaching anchorage means to a conduit or to a tank by which the conduit or tank may be connected to a hanger or a support.

It will be understood that the forms of the invention shown and described are merely illustrative of a preferred embodiment, and that various changes in construction and design may be made in the fitting without departing from the spirit and scope of the invention as defined by the following claims.

I claim:
1. A hollow, tubular outlet fitting having a saddle end adapted to be welded to a cylindrical conduit or the like, said fitting being longer upon one longitudinal side than upon its diametrically-opposite longitudinal side so as to occupy a slanted position on the conduit, said fitting having beveled portions upon both its inner and outer surfaces and extending completely around the saddle end of the fitting, said beveled portions being disposed at varying angles with respect to the longitudinal axis of the fitting, the outer beveled portion extending from the outer surface of the fitting downwardly toward the saddle end and acutely inwardly toward the longitudinal axis at the long side of the fitting and gradually and progressively decreasing to approximately zero angle at the short side of the fitting, and the inner beveled portion extending from the inner surface of the fitting downwardly and acutely outwardly at the short side of the fitting and gradually and progressively decreasing to minimum angularity at the long side of the fitting, and said beveled portions intersecting the saddle end of the fitting to define a narrow edge adapted to seat upon and embrace the cylindrical surface of the conduit in encircling relation to an opening formed in the wall of the conduit, whereby said beveled portions and narrow edge provide in cooperation with the circumference of the conduit a groove for the reception of weld metal to insure a full-penetration weld between the fitting and the conduit.

2. A tubular outlet fitting as set forth in claim 1 adapted to be welded to the arcuate bend of a cylindrical conduit or the like, in which the narrow edge at the saddle end of the fitting defines a surface of double curvature corresponding to the curvature of the conduit.

References Cited in the file of this patent

UNITED STATES PATENTS

| | | |
|---|---|---|
| 49,602 | Brear | Aug. 29, 1865 |
| 1,520,563 | Darley | Dec. 23, 1924 |
| 1,966,403 | Durham | July 10, 1934 |
| 2,074,023 | Patterson | Mar. 16, 1937 |
| 2,428,381 | Parry | Oct. 7, 1947 |
| 2,479,578 | Langvand | Aug. 23, 1949 |